United States Patent
Liu et al.

(10) Patent No.: US 10,157,628 B1
(45) Date of Patent: Dec. 18, 2018

(54) SOUND IDENTIFICATION DEVICE WITH MICROPHONE ARRAY

(71) Applicant: Fortemedia, Inc., Santa Clara, CA (US)

(72) Inventors: Qing-Guang Liu, Sunnyvale, CA (US);
Xiaoyan Lu, Santa Clara, CA (US);
Weiping Zhang, Nanjing (CN)

(73) Assignee: FORTEMEDIA, INC., Santa Clara, CA (US)

( * ) Notice: Subject to any disclaimer, the term of this patent is extended or adjusted under 35 U.S.C. 154(b) by 0 days.

(21) Appl. No.: 15/886,980

(22) Filed: Feb. 2, 2018

Related U.S. Application Data

(60) Provisional application No. 62/582,358, filed on Nov. 7, 2017.

(51) Int. Cl.
| | |
|---|---|
| *H04R 29/00* | (2006.01) |
| *G10L 25/51* | (2013.01) |
| *H04R 3/00* | (2006.01) |
| *H04R 3/04* | (2006.01) |
| *G06F 3/16* | (2006.01) |
| *H04R 1/40* | (2006.01) |

(52) U.S. Cl.
CPC .............. *G10L 25/51* (2013.01); *G06F 3/167* (2013.01); *H04R 1/406* (2013.01); *H04R 3/005* (2013.01); *H04R 3/04* (2013.01)

(58) Field of Classification Search
USPC ... 381/56, 58, 71.1, 71.2, 91, 104, 111, 122, 381/355, 372
See application file for complete search history.

(56) References Cited

U.S. PATENT DOCUMENTS

| | | | |
|---|---|---|---|
| 6,351,222 B1* | 2/2002 | Swan .................... | G08C 23/02 340/13.3 |
| 2012/0093338 A1* | 4/2012 | Levi ..................... | H04R 3/005 381/92 |
| 2016/0249141 A1* | 8/2016 | Verdooner ............ | H04R 1/406 |

* cited by examiner

*Primary Examiner* — Yosef K Laekemariam
(74) *Attorney, Agent, or Firm* — McClure, Qualey & Rodack, LLP

(57) ABSTRACT

A sound identification device is provided. The sound identification device includes a microphone array and a processing unit. The microphone array includes a plurality of microphones disposed within a microphone module mounted on a housing of the sound identification device. Each microphone receives an acoustic signal caused by a gesture performed on a surface of the microphone module and converts the received acoustic signal to a digital acoustic signal. The processing unit is configured to receive the digital acoustic signal from each microphone, and perform a sound identification process on the digital acoustic signal from each microphone to generate a sound identification result conveying information of the gesture. The processing unit controls at least one application program executed by the processing unit according to the sound identification result.

10 Claims, 4 Drawing Sheets

SOUND IDENTIFICATION DEVICE WITH MICROPHONE ARRAY

CROSS REFERENCE TO RELATED APPLICATIONS

This application claims the benefit of U.S. Provisional Application No. 62/582,358 filed on Nov. 7, 2017, the entirety of which is incorporated by reference herein.

BACKGROUND OF THE INVENTION

Field of the Invention

The invention relates to audio processing, and, in particular, to a sound identification device and a method for controlling an electronic device.

Description of the Related Art

In an electronic device such as a mobile phone, a tablet computer, or a laptop, there are peripherals that are used to control some application programs through user interfaces. Typical peripherals include touch screens, and one or more physical buttons (e.g., volume up/down buttons). However, these peripherals may be not activated in some situations, such as when the electronic device is in sleep mode or screensaver mode. However, electronic devices are equipped with one or more microphones disposed or mounted on the housing of the electronic device, and these microphones can be easily reached by the user.

Accordingly, there is a need for a sound identification device and a method for controlling an electronic device to improve user experience.

BRIEF SUMMARY OF THE INVENTION

A detailed description is given in the following embodiments with reference to the accompanying drawings.

In an exemplary embodiment, a sound identification device is provided. The sound identification device includes a microphone array and a processing unit. The microphone array includes a plurality of microphones disposed within a microphone module mounted on the housing of the sound identification device. Each microphone receives an acoustic signal caused by a gesture performed on a surface of the microphone module and converts the received acoustic signal to a digital acoustic signal. The processing unit is configured to receive the digital acoustic signal from each microphone, and perform a sound identification process on the digital acoustic signal from each microphone to generate a sound identification result conveying information of the gesture. The processing unit controls at least one application program executed by the processing unit according to the sound identification result.

In another exemplary embodiment, a method for controlling an electronic device is provided. The electronic device includes a microphone array having a plurality of microphones disposed within a microphone module mounted on a housing of the electronic device. The method includes the steps of: utilizing each microphone to receive an acoustic signal caused by a gesture performed on a surface of the microphone module and convert the received acoustic signal to a digital acoustic signal; perform a sound identification process on the digital acoustic signal from each microphone to generate a sound identification result conveying information of the gesture; and controlling at least one application program executed by the electronic device according to the sound identification result.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
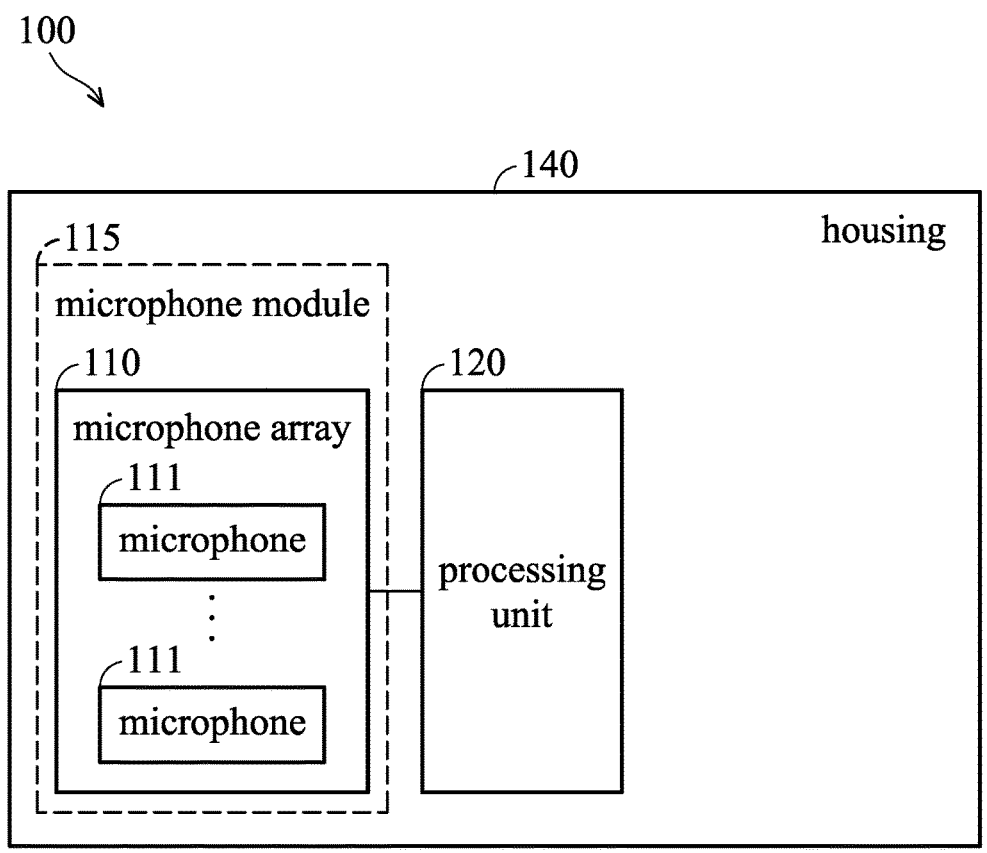
FIG. 1 is a block diagram of a sound identification device in accordance with an embodiment of the invention.

FIG. 1 is a block diagram of a sound identification device in accordance with an embodiment of the invention. In an embodiment, the sound identification device 100 is an electronic device or is disposed in an electronic device such as a smartphone, a tablet PC, a laptop, or a wireless headset, but the invention is not limited thereto. As illustrated in FIG. 1, the sound identification device 100 includes a microphone array 110 and a processing unit 120.

In an embodiment, the microphone array 110 includes at least two microphones 111 configured to receive an ambient sound signal of the sound identification device 100. For example, the received ambient sound is an analog acoustic signal, and each of the microphones 111 may include an analog-to-digital converter (ADC) (not shown) that digitizes the received ambient sound signal with pulse-code modulation (PCM) and outputs a digital acoustic signal in the PCM format. For example, the sampling rate of the microphones 111 can be 8000 Hz or above, but the invention is not limited thereto.

The microphones 111 may be assembled in an acoustic enclosure by industrial standards. The microphones 111 can be spatially distributed in a line, a two-dimensional array or a three-dimensional array, with uniform or non-uniform spacing between the microphones 111.

Specifically, in the embodiment, the microphone array 110 can be disposed in a microphone module 115 mounted on a housing 140 or a substrate configured to be part of the sound identification device 100. The microphones 111 in the microphone array 110 are separated by a predetermined distance from each other, and they are acoustically isolated from each other by an individual chamber in the housing that prevents sound transmission. In addition, the chamber for each microphone 111 has a sound hole on the surface of the microphone module 115, and each microphone 111 may receive acoustic signals from the sound hole.

For example, the distance between two neighboring microphones 111 in the microphone array 110 may be, for example, from 2 millimeters to 15 millimeters, or within an easy coverage of a fingertip, but the invention is not limited thereto.

The processing unit 120 may be a digital signal processor or a general-purpose processor, but the invention is not limited thereto. The processing unit 120 is configured to receive the digital acoustic signal from each microphone 111 in the microphone array 110, and perform a sound identification process to recognize gestures performed on the microphone array 110 to generate a sound identification result conveying information about the gesture.

Figure 2A:
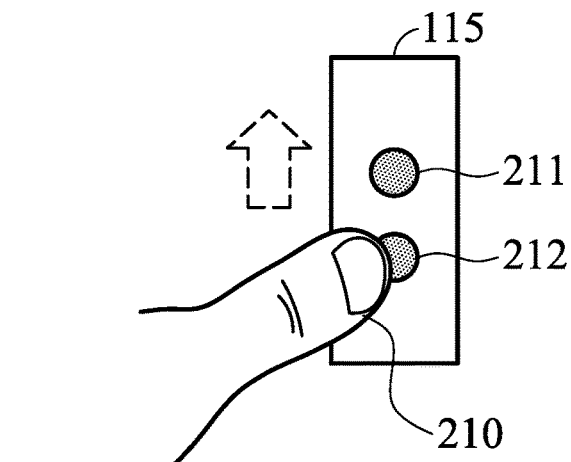
FIGS. 2A and 2B are diagrams of gestures performed on the microphone array in accordance with an embodiment of the invention.
Figure 2B:
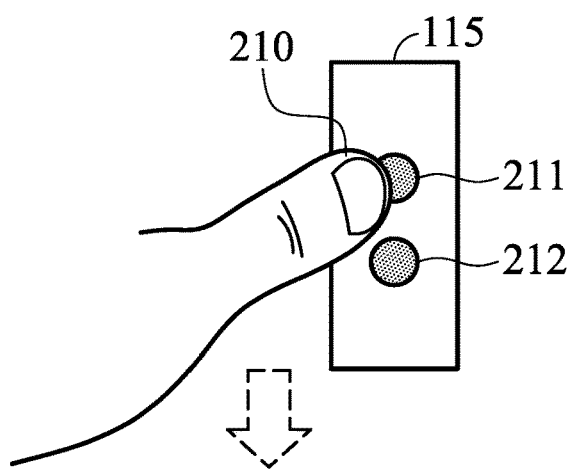

FIGS. 2A and 2B are diagrams of gestures performed on the microphone array in accordance with an embodiment of the invention. For purposes of description, it is assumed that the microphone array 110 has two microphones 111.

In an embodiment, the user may use his or her fingertip 210 to touch the surface of the microphone module 115 with sound holes 211 and 212 and slide from one hole to another. For example, when the fingertip 210 moves from sound hole 212 to sound hole 211, it indicates an upward motion, as shown in FIG. 2A. When the fingertip 210 moves from sound hole 211 to sound hole 212, it indicates a downward motion, as shown in FIG. 2B. It should be noted that there are more complicated gestures when more microphones 111 with sound holes are used.

With such finger movements over the sound holes 211 and 212, the microphones 111 will receive acoustic signals from the surface of the microphone module 115 with the gestures (e.g., touch and slide operation) performed by the fingertip. Specifically, when a gesture is performed by the fingertip 210 on the surface of the microphone module 115, it will cause an acoustic signal that can be received by the microphones 111 disposed in the microphone module 115. In other words, the sound source for the sound identification process can be coming from the surface that is being touched by the fingertip (i.e., gesture). Then, the acoustic signal caused by the gesture on the surface of the microphone module 115 will be converted into a digital acoustic signal that is transmitted to the processing unit 120 for subsequent sound identification processing.

Figure 3:
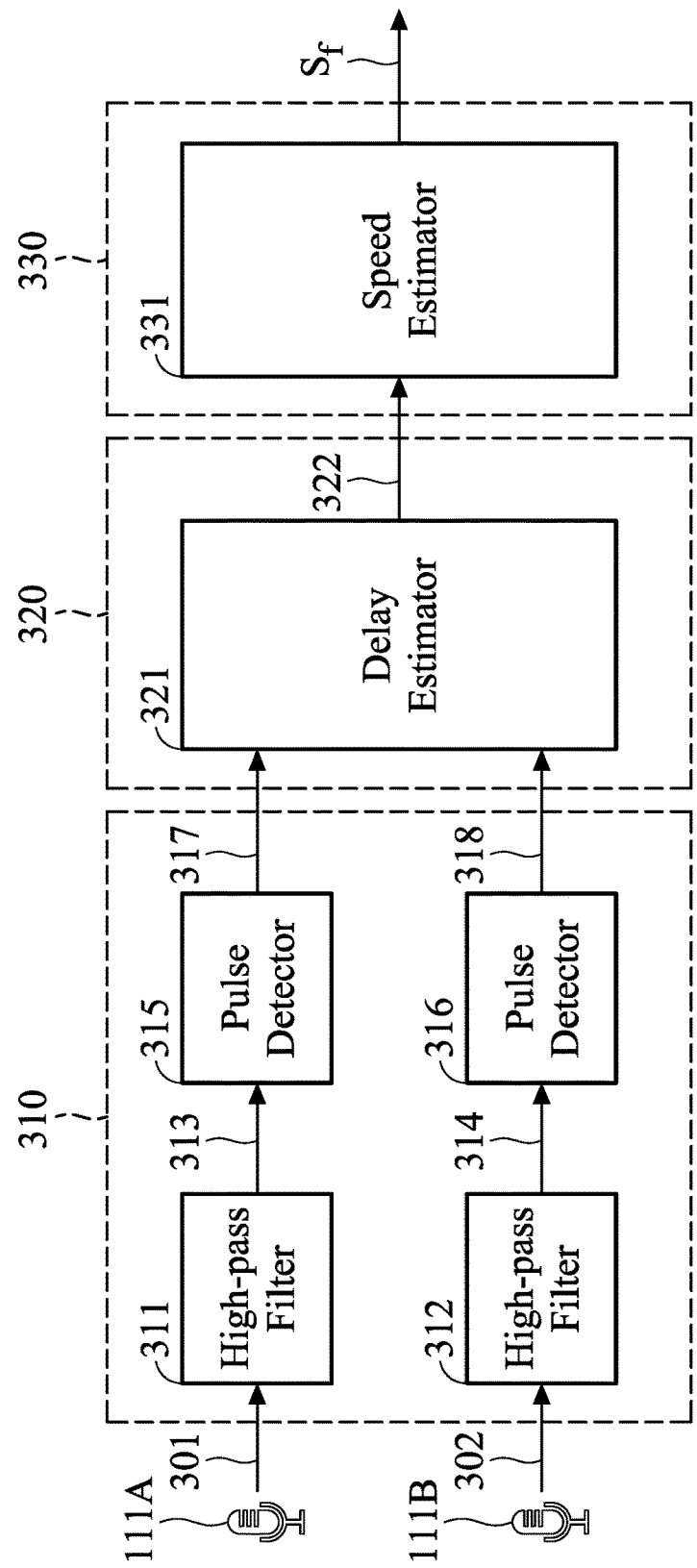
FIG. 3 is a diagram of the sound identification process in accordance with an embodiment of the invention.

FIG. 3 is a diagram of the sound identification process in accordance with an embodiment of the invention.

In an embodiment, the sound identification process performed by the processing unit 120 may include the following stages: a preprocessing stage 310, direction-identification stage 320, and speed estimation stage 330. In the preprocessing stage 310, the processing unit 120 may apply linear or non-linear filters to the digital acoustic signals from the microphones 111 to reduce interfering signals, which may include ambient noise or human voices.

In the direction-identification stage 320, the processing unit 120 may identify the direction of the gesture such as the sliding direction of the fingertip over the microphone array 110. In the speed-estimation stage 330, the processing unit 120 may estimate the speed of the gesture (e.g., sliding of the fingertip).

In an embodiment, the microphone array 110 includes microphones 111A and 111B. As illustrated in FIG. 3, each of the microphones 111A and 111B may receive an acoustic signal from the surface of the microphone module 115, and the acoustic signal received by microphones 111A and 111B is converted into a first digital acoustic signal 301 and a second digital acoustic signal 302, respectively. The first digital acoustic signal 301 from the microphone 111A is sent to a high-pass filter 311, and the second digital acoustic signal 302 from the microphone 111B is sent to a high-pass filter 312.

For example, the high-pass filter 311 and the high-pass filter 312 may be similar to each other, and may be applied to the first digital acoustic signal 301 and the second digital acoustic signal 302 to reduce ambient noise such as wind noises, car noises, and other types of noises that present mostly in the low-frequency range. The cut-off frequency of the first high-pass filter 311 and the second high-pass filter 312 may be between 1000 Hz and 2000 Hz, but the invention is not limited thereto.

The filtered first digital acoustic signal 313 and the filtered second digital acoustic signal 314 are sent to a pulse detector 315 and a pulse detector 316, respectively. The pulse detector 315 and the pulse detector 316 may be similar to each other. For example, the waveform of the acoustic signal caused by the gesture performed on the surface of the microphone module 115 may be a pulse or a short burst in the time domain. The pulse detector 315 and the pulse detector 316 may determine the candidate of the microphone-touch signal.

Specifically, the pulse detector 315 may set a threshold that is used to identify the filtered first digital acoustic signal 313 having amplitude greater than the threshold. If the filtered first digital acoustic signal 313 has amplitude greater than the threshold, the pulse detector 315 may calculate the duration over which the filtered first digital acoustic signal 313 has its amplitude over the threshold.

When the calculated duration is shorter than a predetermined period, the pulse detector 315 may detect a first pulse signal from the filtered first digital acoustic signal 313, and then mark the time information 317 corresponding to the first pulse signal. The time information 317 is sent to the delay estimator 321.

Similarly, when the calculated duration is shorter than the predetermined period, the pulse detector 316 may also detect a second pulse signal from the filtered second digital acoustic signal 3144e3, and then mark the time information 318 corresponding to the second pulse signal. The time information 318 is sent to the delay estimator 321. It should be noted that the high-pass filters 311~312 and pulse-detectors 315-316 are included in the preprocessing stage 310.

The direction-identification stage 320 includes the delay estimator 321 that is configured to estimate the time difference between the pulse signals from the pulse detectors 315 and 316. For example, if the user's fingertip is sliding on the surface of the microphone module 115, the pulse signal detected by the pulse detector for each microphone 111 may occur at different times. Thus, the time difference (i.e., time delay) between the pulse signals detected by the pulse detectors 315 and 316 can be used to estimate the direction and speed of the sliding operation.

Specifically, if the time difference is within a predetermined range, the delay estimator 321 may determine that the sliding operation on the surface of the microphone array 110 is a valid sliding event. The time difference can be a positive or negative number, representing the directions of the sliding operation, respectively. For example, a positive time difference may indicate an upward direction, and a negative time difference may indicate a downward direction. Alternatively, a positive time difference may indicate a left-to-right direction, and a negative time difference may indicate a right-to-left direction. It should be noted that the directions in the above-mentioned embodiments are for purposes of description, and the directions may depend on the arrangement of the microphones 111 in the microphone array 110.

For example, the speed of the sliding operation can be expressed by the following equation:

$$S_1 = D/T \quad (1)$$

where D denotes the distance between adjacent microphones; T denotes the estimated time difference (i.e., time delay); and $S_1$ denotes the speed of the sliding operation. As described above, the estimated time difference may be a positive or negative number, representing the respective directions of the sliding operation.

The speed estimation stage 330 includes the speed estimator 331 that is configured to estimate the final speed of the overall sliding event. For example, the speed estimated by the delay estimator 321 may indicate the speed of a single movement (e.g., sliding operation). However, the overall gesture may include one or more movements. The speed estimator 331 may adjust the final speed by considering the subsequent movements. The final speed Sf can be expressed by the following equation:

$$S_f = S_1 + W_2 * S_2 + \ldots + W_N * S_N \quad (2)$$

where N is a positive integer; $W_2, W_3, \ldots, W_N$ are weighting values between 0 and 1; and $S_1, S_2, \ldots, S_N$ are estimated speeds with respect to the $1^{st}, 2^{nd}, \ldots$, nth sliding operations. Specifically, in a predetermined time-window, if there is only one sliding operation, the final speed $S_f$ equals to the speed $S_1$ corresponding to the first sliding operation. Otherwise, the final speed $S_f$ is a weighted sum of the estimated speeds of multiple movements in the gesture.

After calculating the final speed $S_f$, the processing unit 120 may generate a sound identification signal indicating the direction and speed of the gesture.

In the embodiment of FIGS. 2A and 2B, the SID output signal may be expressed by a signed digit X, an integer or a real number, with the following definition in Table 1.

TABLE 1

| Definition of X: signed digit | |
|---|---|
| Sign of X | Direction of fingertip's movement:<br>Plus (+): upward<br>Minus (−): downward |
| Absolute value of X | The speed of the movement.<br>It can be limited to a range: $\|X\| \leq X_{Max}$, where $X_{Max}$ is a predefined boundary |

The value of X can be used to control an application program or a device driver in an electronic device for various applications. The applications may include, but are not limited to, scrolling a screen in a web browser or a document editor, volume control in a media player, fast forward or rewind in a media player, zooming in or out in camera shooting, and unlocking the screen in screensaver mode. The operations for the above-mentioned applications are described in Table 2.

TABLE 2

| Applications | How to use X |
|---|---|
| Scroll a screen for screen reading and editing such as in a web browser or a document editor | The sign of X represents scrolling up or down;The absolute value represents the speed of scrolling |
| Volume control in a media player | The sign of X represents tuning volume up or down; The absolute value represents the scale of the volume change |
| Fast forward or rewind in a media player | The sign of X represents fast-forward or fast-rewind;The absolute value represents the speed of the move |
| Zooming in or out in camera shooting | The sign of X represents zoom in or zoom out; The absolute value represents the scale of the zooming |
| Unlocking the screen in screen saving mode | Pre-store the pattern of the fingertip's movement on the microphones, including:<br>a. the number of touches |

TABLE 2-continued

| Applications | How to use X |
|---|---|
| | b. direction and speed of each touch<br>Unlock the screen when the new touch matches the pre-installed pattern during the screen saving mode |
| Volume control of the speaker in a wireless headset change | The sign of X represents tuning volume up or down; The absolute value represents the scale of the volume |

Figure 4:
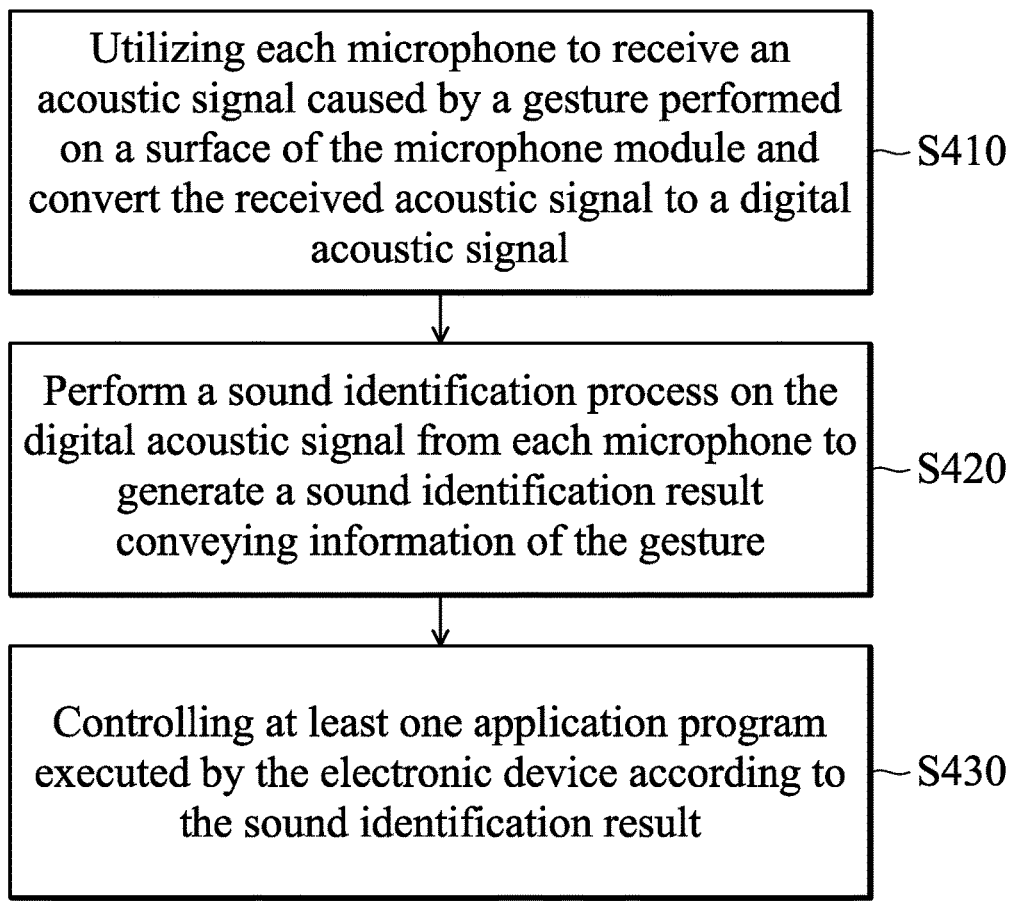
FIG. 4 is a flowchart of a method for controlling an electronic device in accordance with an embodiment of the invention.

FIG. 4 is a flow chart of a method for controlling an electronic device in accordance with an embodiment of the invention.

In step S410, each microphone 111 in the microphone array 110 is utilized to receive an acoustic signal caused by a gesture (e.g., a touch and sliding operation) performed on a surface of the microphone module 115 and convert the received acoustic signal to a digital acoustic signal. For example, the gesture performed on the surface of the microphone module 115 may be a sound source to cause the acoustic signal that can be received by each microphone 111.

In step S420, a sound identification process is performed on the digital acoustic signal from each microphone to generate a sound identification result conveying information of the gesture. For example, the sound identification process may include a preprocessing stage 310, a direction-identification stage 320, and a speed-estimation stage 330, as described in the embodiment of FIG. 3.

In step S430, at least one application program executed by the electronic device (e.g., the sound identification device) is controlled according to the sound identification result. For example, the sound identification result conveys information about the direction (e.g. sign of the sound identification result) and speed (e.g., absolute value of the sound identification result) of the gesture.

In view of the above, a sound identification device and a method for controlling an electronic device are provided. The sound identification device and the method are capable of controlling an electronic device using a microphone array. After a sound identification process is performed on the digital acoustic signal from each microphone of the microphone array, the direction and speed of the gesture performed on the surface of the microphone module can be estimated. Thus, one or more application programs executed by the electronic device can be controlled using the sound identification result of the sound identification process without using typical peripherals such as a touch screen or physical buttons. Since the microphone module including the microphone array can be easily reached by the user, the user experience of controlling the electronic device can be improved.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A sound identification device, comprising:
a microphone array, comprising a plurality of microphones disposed within a microphone apparatus mounted on a housing of the sound identification device, wherein each microphone receives an acoustic signal caused by a gesture performed on a surface of the microphone module and converts the received acoustic signal to a digital acoustic signal; and
a processor, configured to receive the digital acoustic signal from each microphone, and perform a sound identification process on the digital acoustic signal from each microphone to generate a sound identification result conveying information of the gesture,
wherein the processor controls at least one application program executed by the processor to perform a specific operation according to the sound identification result,
wherein the processor applies a high-pass filter to the digital acoustic signal from each microphone and detects a pulse signal from the filtered digital acoustic signal of each microphone.

2. The sound identification device as claimed in claim 1, wherein a distance between two neighboring microphones in the microphone array is from 2 millimeters to 15 millimeters.

3. The sound identification device as claimed in claim 1, wherein the processor further calculates time difference between the filtered digital acoustic signals from the microphones to determine speed of each movement in the gesture.

4. The sound identification device as claimed in claim 3, wherein the processor further calculates a weighted sum of the speed of the movements in the gesture to generate the sound identification result, where a sign of the sound identification result indicates a direction of the gesture, and an absolute value of the sound identification result indicates the speed of the gesture.

5. The sound identification device as claimed in claim 1, wherein the specific operation comprises screen scrolling, volume control, fast forward or rewind, zooming in or out, and screen unlocking.

6. A method for controlling an electronic device, wherein the electronic device comprises a microphone array having a plurality of microphones disposed within a microphone apparatus mounted on a housing of the electronic device, the method comprising:
utilizing each microphone to receive an acoustic signal caused by a gesture performed on a surface of the microphone apparatus and convert the received acoustic signal to a digital acoustic signal;
applying a high-pass filter to the digital acoustic signal from each microphone;
detecting a pulse signal from the filtered digital acoustic signal of each microphone;
performing a sound identification process on the digital acoustic signal from each microphone to generate a sound identification result conveying information of the gesture; and
controlling at least one application program executed by the electronic device to perform a specific operation according to the sound identification result.

7. The method as claimed in claim 6, wherein a distance between two neighboring microphones in the microphone array is from 2 millimeters to 15 millimeters.

8. The method as claimed in claim 6, further comprising:
calculating the time difference between the filtered digital acoustic signals from the microphones to determine speed of each movement in the gesture.

9. The method as claimed in claim 8, further comprising:
calculating a weighted sum of the speed of the movements in the gesture to generate the sound identification result,
wherein a sign of the sound identification result indicates a direction of the gesture, and an absolute of the sound identification result indicates the speed of the gesture.

10. The method as claimed in claim 9, wherein the specific operation comprises screen scrolling, volume control, fast forward or rewind, zooming in or out, and screen unlocking.

* * * * *